United States Patent Office 2,813,019
Patented Nov. 12, 1957

2,813,019

METHOD OF PRODUCING ZIRCONIUM METAL

Carl Marcus Olson, Newark, Del., assignor to E. I. du Pont de Nemours and Company, Wilmington, Del., a corporation of Delaware No Drawing. Application October 12, 1951,
Serial No. 251,135

5 Claims. (Cl. 75—84.4)

This invention relates to the preparation of zirconium metal by interacting a zirconium halide with an active reducing metal therefor. More particularly it relates to the production of ductile, highly pure zirconium which is relatively free of undesired impurities such as oxygen, nitrogen, sulphur, and metallic elements like iron or silicon, and through reduction of a chloride of zirconium with an active reducing metal such as magnesium.

Zirconium metal has recently become commercially important. Its value as a material of construction is becoming increasingly recognized because of its excellent corrosion resistance and favorable properties under thermal stress. The advances in nuclear engineering have placed severe strain upon common materials of construction and have resulted in uses for zirconium metal which demand properties obtainable only in the highest purity metal. Up to the present, the preparation of high purity metallic zirconium has been achieved only by the use of a relatively complex, commercially uneconomical process. Innumerable attempts to produce zirconium metal by simpler methods have resulted in a product deficient in desirable and essential properties such as workability and resistance to corrosion and containing impurities which limit its usefulness in nuclear engineering applications. Investigators in this field have shown that traces of oxygen and nitrogen absorbed during production constitute one major obstacle to achieving ductility. Also, the fact that the metal has been produced in small batch lots usually on a pilot plant scale has led to serious difficulties because the purity of different lots has varied significantly.

Of the known prior art methods, the so-called "hot-wire" process, wherein zirconium iodide is thermally decomposed, has produced the purest metal, but the size and rate of production are limited. Also this process, as presently practiced, is essentially a purification process since metallic zirconium is a necessary raw material. The total process utilized in this "hot-wire" method is therefore complex and costly and results in a very expensive product.

A less pure zirconium with less corrosion resistance and containing impurities which limit its nuclear engineering applications has been produced by the reduction of zirconium tetrachloride by molten magnesium. This latter process is potentially much more economical, the rate of production desirably higher and the size of each batch larger than in the "hot-wire" method. Therefore, means for producing adequate purity of the metal product obtained from this process are highly desirable.

The magnesium metal of commerce used in such zirconium tetrachloride reduction process contains oxygen, nitrogen, and other impuritiees which are transferred to the zirconium metal product during the reduction reaction. Attempts to obtain and utilize hyper-pure magnesium have naturally rendered the process at least as expensive as the "hot-wire" method. In summation, it is most imperative that means be devised to produce zirconium of the maximum purity for the many uses wherein the present state of this property limits its application.

This invention has among its objects to provide a solution to this difficulty. A particular object is to prepare a zirconium metal product of greater purity than heretofore produced and by a relatively inexpensive, commercially utilizable method wherein the reduction of a zirconium halide by magnesium metal can be effected. A specific object is to limit the amount of harmful impurities entering the zirconium metal product by a reduction process utilizing a pre-treatment of the magnesium reductant.

The above and other objects are realized by this invention which broadly comprises producing zirconium metal by purifying or scavenging the molten active reducing metal with zirconium metal to remove such impurities as oxides, nitrides, and other contaminants present in the reducing metal, employing the resulting purified reducing metal to reduce a zirconium halide, and separating the resulting high-purity zirconium metal from the by-product metal halide.

A specific embodiment of my invention comprises contacting magnesium with zirconium metal at a temperature between about 800° C. and 1000° C., subsequently separating the zirconium from the molten magnesium, reacting the latter with a zirconium tetrachloride, and recovering and purifying the desired zirconium metal product. Such product may then be freed of magnesium halide by-product, melted and cast, and subsequently finished in known ways. If desired, a portion of the metal product may be utilized for scavenging and subsequently recycled to a halogenation operation for recovery of the zirconium values as metal halide.

Essentially, any desired means for contacting the magnesium with the zirconium scavenger may be employed. There are two methods to which I prefer to resort because of their simplicity and effectiveness, but obviously any alternative method designed to effect the same results will readily suggest itself to those skilled in the art. According to one such preferred method, molten commercial magnesium metal required for the subsequent zirconium halide reduction is placed within a suitable metal reaction chamber, such as one fabricated of iron, wherein it is maintained at about 900° C. to effect melting of the magnesium. Zirconium shavings or scrap, held within a suitable container such as a perforated basket-like metal container, are then brought in contact with the molten magnesium and for a period of time sufficient to effect adequate scavenging. In general, this entails a period of between one and three or four hours' time, depending upon the quantity of the zirconium scavenger, the amount of magnesium to be purified, the temperature used, and similar considerations. During this time period of treatment, convection currents in the molten magnesium cause all portions thereof to come into contact with the surface of the zirconium which absorbs the various impurities therein. In addition, iron or other oxides scale on the interior walls of the reaction vessel can be reduced by the magnesium to thereby form magnesium oxide which in turn is carried by the liquid metal to the zirconium particles. The zirconium thereupon reduces the magnesium oxide back to pure magnesium metal. In this phase, substantially all oxygen and nitrogen and like impurities within the reaction vessel eventually find their way to the zirconium metal in the basket to become retained by the zirconium. After such a treatment the zirconium metal scrap is removed from the magnesium melt and a purified zirconium halide, such as $ZrCl_4$, is then added to the purified magnesium. The reduction reaction then proceeds in the conventional and known manner to form zirconium metal and a magnesium halide by-product.

According to my second preferred contact operation, a bed of subdivided zirconium, in the form of, for example, chips or granules, is heated in a closed vessel under an inert atmosphere of a rare gas such as argon, helium, etc., to from, say, about 800° C.–1000° C., depending on the type of material employed as the vessel or container therefor. Molten magnesium requiring purification is passed through this bed, in consequence of which undesired oxides and other contaminants are removed by absorption into the zirconium scavenger. Preferably, the magnesium passes directly from this bed into the reaction chamber wherein the zirconium halide reduction is to take place, for by such a method the magnesium has essentially no contact with air which might possibly recontaminate it. This second preferred procedure has the advantage that it enables the employment of scrap magnesium containing minor amounts of other materials as well as oxygen, nitrogen, etc., in zirconium production so that the cost is correspondingly reduced. Scrap magnesium normally contains alloying ingredients such as iron, copper, or zinc, which might be detrimental to zirconium quality as well as oxygen or nitrogen. By passing the magnesium through this zirconium bed, such impurities are removed. Those impurities such as sodium or alkaline earth metals which are not thus removed will subsequently leave the zirconium metal product during the halide reduction or final finishing and therefore will not be harmful. The first preferred procedure described above has the advantage of purifying not only the magnesium but also the reaction vessel which the second preferred operation apparently does not do. It is possible, however, to effect a combination of the two operations, or to devise numerous alternatives and variations, all of which are recognized as within the scope of my inventive concept.

To a clearer understanding of the invention, the following examples are given. These are merely in illustration and not in limitation of the invention:

*Example I*

An upright cylindrical iron reaction chamber, having an approximate 2-foot diameter and 4-foot height, was provided with an air-tight cover, a side inlet port for admission of $ZrCl_4$, and a tapping or outlet port for removal of molten by-product chloride. Into this vessel were charged 330 lbs. of commercial magnesium in ingot form. An iron wire basket containing 100 lbs. of zirconium chips was lowered among the magnesium ingots by means of a wire, threaded through a gas-tight gland in the vessel's cover. The cover was bolted to the vessel with an air-tight gasket and the interior of the chamber primarily flushed with argon to eliminate contamination by air. Thereupon the vessel was heated to 900° C., thereby melting the ingots; and the molten magnesium was maintained in contact with the zirconium chips for a period of two hours. At the end of that time, the temperature was lowered to 700° C. and the zirconium chips were raised out of the melt to the top of the vessel. Zirconium tetrachloride, which previously had been treated with hydrogen to reduce its iron chloride contamination to the less volatile ferrous chloride state, was then added via the inlet port and at the rate of 5 lbs. per minute until a total of 1575 lbs. had been introduced. The rate of addition and heating source were regulated so as to hold the reactor temperature below 920° C. The zirconium tetrachloride was reduced by the molten magnesium, resulting in the formation of zirconium metal sponge and molten magnesium chloride by-product. A major portion of the magnesium chloride was first removed in the molten state from the reactor by simple tapping off. The remaining zirconium sponge, containing residual quantities of magnesium and magnesium chloride, was then subjected to vacuum distillation to effect removal of these residual impurities. The resulting purified zirconium metal was finally melted in a water-cooled copper wall arc furnace.

The zirconium thus obtained was found to be of superior quality to that prepared in the same manner, but without the recourse to the preliminary magnesium scavenging treatment therein resorted to. A consolidated pellet of the zirconium obtained in accordance with this invention showed a Vickers hardness number of 114, and could be cold-rolled to strip with 88% reduction without edge cracking. In contrast thereto, a pellet produced from zirconium metal obtained by reducing zirconium tetrachloride with unpurified magnesium had a Vickers hardness number of 190 and could be cold-rolled only to 30% reduction before edge cracking was in evidence.

*Example II*

An iron reaction vessel of the same dimension and type used in Example I was provided with an outlet for tapping of magnesium chloride by-product and with a gastight cover in which there were two inlet ports: one for the admission of zirconium tetrachloride and the other for the addition of molten magnesium. The latter entrance port was provided with a valve connection leading to an iron funnel of 2 cu. ft. capacity positioned above the vessel. This funnel contained a bed of 150 lbs. of zirconium in the form of granules up to 3 millimeters in diameter. The reactor and the attached funnel were both maintained at a temperature of 800° C. by external heating means. 350 lbs. of molten scrap magnesium were poured into the funnel and percolated downward through the bed of zirconium granules to drain into the reaction vessel. The valve from the funnel was closed when the molten magnesium had collected in the vessel and the zirconium tetrachloride entrance port was opened. 1430 lbs. of zirconium tetrachloride previously treated with hydrogen to reduce its ferric chloride contamination were then added to the purified molten magnesium. Interaction of the purified magnesium and the $ZrCl_4$ took place from which a zirconium metal sponge product was recovered in the same manner as described in Example I. The quality of the sponge was not quite as high as that obtained from that example but was far superior to that produced by the use of unscavenged magnesium in a comparable reduction. The product without such scavenging treatment was so deficient that the metal resulting therefrom was too hard and brittle and could not be worked except at highly elevated temperatures.

The reason for the efficacy of zirconium as a novel scavenger for magnesium is that zirconium can absorb up to 30–40 atoms percent of nitrogen or somewhat less than that of oxygen at temperatures above about 600–700° C. These contaminants actually penetrate the zirconium lattice and are absorbed thereby. As in the case of most absorption phenomena, the greater the surface of the zirconium exposed, generally the more efficient its scavenging ability; hence the quantity and character of the zirconium is a factor which must be considered. The amount thus used must be in excess of the amount of impurities being scavenged from the magnesium and on a weight basis ranges from at least 10 to, say, 200 lbs. of zirconium per pound of impurity, such as oxygen, nitrogen, etc., to be removed. The rate of penetration is accelerated by higher temperatures; hence, the temperature to be used is interdependent with the time of contact between the zirconium and the magnesium, as well as with the degree of contamination of the magnesium and the character of the zirconium. If much time is allowed, of course, a lower temperature is possible, limited only by the fact that the melting point of magnesium is 651° C. and of course it is possible to speed the scavenging by raising the temperature, but limited here by the fact that magnesium will vaporize at ordinary pressures, at about 1100° C. Consequently, I generally conduct the purification operation at temperatures ranging from 700° C. to 920° C. and usually prefer a temperature between 850° C. and 900° C.

Magnesium may be scavenged by agents other than zirconium; for instance in my copending application, Serial No. 133,011, filed December 14, 1949, now abandoned, titanium metal is utilized to remove similar impurities from magnesium to be used in the subsequent preparation of titanium metal. The use of magnesium obtained from my copending method would produce a product having a minimum of impurities such as oxygen and nitrogen but would introduce an undesirable amount of titanium metal impurity into the zirconium metal product. This arises because of the solubility of titanium in magnesium, although slight at the temperatures utilized in the scavenging operation. This solubility of titanium metal in molten magnesium lies in the range of about .1% titanium metal. The product of my present novel method contains no additional metallic impurity because although there is probably some solubility of zirconium in magnesium metal, the zirconium metal product will not be contaminated thereby.

Magnesium is a valuable reducing agent for reaction with any one of the various zirconium halides. Because of its commercial availability, zirconium tetrachloride is generally considered as the preferred source of zirconium metal by the magnesium reduction thereof; but the other halides such as the bromides or iodides are also operable. While the method of my invention is especially applicable to the treatment of Mg, the oxide, nitride and impurity content or other active reducing metals useful in the zirconium reduction process, such as sodium, potassium, alloys of sodium and potassium, lithium and calcium, may be substantially reduced by the use of my invention. The treatment of the molten metal with subdivided zirconium scavenger results in the transfer of these deleterious impurities from the molten metal to the zirconium scavenger thereby minimizing the contamination of the zirconium metal produced in the subsequent reduction step. It is possible to recover the zirconium metal used as the scavenging agent by simple chlorination.

It is thus obvious that my invention provides a relatively simple and inexpensive means for the production of ductile zirconium of improved purity. This is done with a minimum of inconvenience to the operators and without the purchase of additional purification reagents. The reagent is a product of the process and may be used as the high purity product, but of course scrap zirconium metal products such as are often available in metal producing plants may be used in the scavenging operation.

I claim as my invention:

1. A process for the production of pure ductile zirconium metal through reduction of a zirconium halide with an active reducing metal therefor which comprises prior to said reduction removing contaminating impurities from said active reducing metal selected from the group consisting of alkali and alkaline earth metals and alloys thereof by subjecting it while in the molten state under an inert atmosphere to direct contact with particles of zirconium metal for a period of time sufficient to effect scavenging of said impurities by said zirconium metal particles.

2. A process for the production of pure ductile zirconium metal through reduction of a zirconium halide with magnesium which comprises prior to said reduction removing contaminating impurities from said magnesium by directly contacting it in molten state under an inert atmosphere and at temperatures ranging from the melting point of magnesium to below 1100° C. with particles of zirconium metal and for a period of time sufficient to effect scavenging of said impurities by said zirconium metal particles.

3. A process for the production of pure ductile zirconium metal through reaction at an elevated temperature of magnesium with a zirconium halide comprising prior to said reaction directly contacting the magnesium in molten state under an inert atmosphere with zirconium metal in subdivided form at a temperature between 700° C. and 920° C. for a period of time sufficient to effect scavenging of impurities present in said magnesium by said zirconium metal.

4. A process for the production of pure ductile zirconium metal which comprises directly contacting molten magnesium in a closed reaction chamber under an inert atmosphere at a temperature ranging from 800° C. to 1000° C. with zirconium metal in a divided form for a period of time sufficient to effect scavenging of impurities present in said magnesium by said zirconium metal, subsequently removing said zirconium metal from said chamber, introducing a zirconium halide therein to effect reduction thereof by the purified molten magnesium, and recovering the ductile zirconium metal product resulting from said reduction.

5. A process for the production of pure ductile zirconium metal which comprises passing molten magnesium through a bed of subdivided zirconium metal maintained under an inert atmosphere and at a temperature ranging from 700° C. to 920° C., effecting contact therebetween for a period of from 3 to 4 hours to scavenge impurities present in said magnesium by said subdivided zirconium, thereafter collecting the resulting purified magnesium in a reaction chamber maintained under an inert atmosphere, introducing a zirconium halide to said chamber, reducing the halide with the magnesium to form zirconium metal and by-product magnesium halide, and separating said zirconium from said magnesium halide.

References Cited in the file of this patent

UNITED STATES PATENTS

| 1,019,531 | Rossi | Mar. 5, 1912 |
| 2,205,854 | Kroll | June 25, 1940 |
| 2,546,320 | Rostron | Mar. 27, 1951 |
| 2,564,337 | Maddex | Aug. 14, 1951 |
| 2,707,679 | Lilliendahl et al. | May 3, 1955 |

FOREIGN PATENTS

| 1,814/31 | Australia | Oct. 9, 1935 |
| 594,152 | Great Britain | Nov. 4, 1947 |

OTHER REFERENCES

Metal Industry, October 18, 1946, pages 319–322, inclusive.

Technical Information on Titanium Metal, by Remington Arms Co., Inc., Bridgeport, Conn. Received April 15, 1949. Entire report in 28 pages. Pages 24 and 25 relied upon.

Production of Ductile Titanium at Boulder City, Nevada, by Wartman et al. Bureau of Mines Report of Investigations 4519. Published August 1949 by Bureau of Mines. Entire report is 37 pages and is available at the Bureau of Mines. Page 25 is relied upon.